(12) United States Patent
Schnur et al.

(10) Patent No.: US 9,180,842 B2
(45) Date of Patent: Nov. 10, 2015

(54) DISC BRAKES

(75) Inventors: Eduard Schnur, Kempten (DE); Klaus Bayer, Marktoberdorf (CH)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 14/128,002

(22) PCT Filed: Jun. 11, 2012

(86) PCT No.: PCT/EP2012/060973
§ 371 (c)(1),
(2), (4) Date: Dec. 20, 2013

(87) PCT Pub. No.: WO2012/175355
PCT Pub. Date: Dec. 27, 2012

(65) Prior Publication Data
US 2014/0131147 A1    May 15, 2014

(30) Foreign Application Priority Data

Jun. 23, 2011    (GB) .................................. 1110634.1

(51) Int. Cl.
*B60T 1/06*     (2006.01)
*F16D 55/14*    (2006.01)
(Continued)

(52) U.S. Cl.
CPC ................. *B60T 1/065* (2013.01); *F16D 55/04* (2013.01); *F16D 55/14* (2013.01); *F16D 65/22* (2013.01); *F16D 65/853* (2013.01);
(Continued)

(58) Field of Classification Search
CPC ......... B60T 1/065; F16D 55/14; F16D 55/04; F16D 65/22; F16D 65/853; F16D 2055/0058; F16D 2121/14; F16D 2123/00; F16D 2125/66
USPC ............................ 188/71.5, 71.6, 72.7, 264 R
See application file for complete search history.

(56) References Cited

U.S. PATENT DOCUMENTS 2,883,008  A  *   4/1959  Lucker .......................... 188/71.3
5,355,978  A  *  10/1994  Price et al. ................. 188/264 D
2006/0054431 A1* 3/2006  Gilles et al. .................... 188/265

FOREIGN PATENT DOCUMENTS

DE    8808462     *  10/1989
DE    8808462 U1    10/1989
(Continued)

OTHER PUBLICATIONS

International Search Report for International Application No. PCT/EP2012/060973 dated Feb. 27, 2013.

*Primary Examiner* — Robert A Siconolfi
*Assistant Examiner* — Charles Poon

(57) ABSTRACT

A multi-plate disc brake has interleaved rotatable and non-rotatable brake discs (11) within a brake housing (13) and a ball and ramp type brake actuator (12) comprising first and second relatively rotatable annular actuator discs (20, 21) with actuator balls (22) therebetween located in circumferentially ramped pockets (20a, 21a) on opposing faces of the actuator discs. A wedge-shaped actuator member (23) has an actuating means (24A, 24B) to displace the actuator member between confronting abutments (20b, 21b) on the respective actuator discs to relatively rotate the discs to cause the balls to rise up the ramped pockets and hence expand the actuator axially to move the brake discs (11) into engagement. Cooling oil is supplied into the brake housing through the wedge-shaped actuator member (23) when the brake is engaged.

7 Claims, 3 Drawing Sheets

(51) Int. Cl.
*F16D 65/22* (2006.01)
*F16D 65/853* (2006.01)
*F16D 55/04* (2006.01)
*F16D 121/14* (2012.01)
*F16D 125/66* (2012.01)
*F16D 55/00* (2006.01)

(52) U.S. Cl.
CPC .... *F16D 2055/0058* (2013.01); *F16D 2121/14* (2013.01); *F16D 2125/66* (2013.01)

(56) References Cited

FOREIGN PATENT DOCUMENTS

| | | | |
|---|---|---|---|
| DE | 9109201 | * | 9/1991 |
| DE | 9109201 U1 | | 9/1991 |
| EP | 0558283 | * | 9/1993 |
| EP | 0558283 A1 | | 9/1993 |
| EP | 0565193 | * | 10/1993 |
| WO | WO9956031 | * | 11/1999 |

* cited by examiner

DISC BRAKES

BACKGROUND OF THE INVENTION

This invention relates to disc brakes and in particular to so-called wedge operated disc brakes which comprise interleaved rotatable and non-rotatable brake discs within a brake housing, a ball and ramp type brake actuator comprising first and second relatively rotatable annular actuator discs with actuator balls therebetween located in circumferentially ramped pockets formed in opposing faces of the actuator discs, a wedge-shaped actuator member and an actuating means to displace the actuator member between confronting abutments on the respective actuator discs to relatively rotate the discs to cause the balls to rise up the ramped pockets and hence expand the actuator axially to move the brake discs into engagement.

Such wedge operated disc brakes are well known and are used, for example, in agricultural or industrial tractors and other similar vehicles.

Since such brakes are used in heavy braking applications it is a requirement to provide for the cooling of such brakes to avoid overheating.

OVERVIEW OF THE INVENTION

It is an object of the present invention to provide such a brake with a simple and efficient cooling arrangement.

Thus according to the present invention there is provided a multi-plate disc brake comprising interleaved rotatable and non-rotatable brake discs within a brake housing, a ball and ramp type brake actuator comprising first and second relatively rotatable annular actuator discs with actuator balls therebetween located in circumferentially ramped pockets formed in opposing faces of the actuator discs, a wedge-shaped actuator member and an actuating means to displace the actuator member between confronting abutments on the respective actuator discs to relatively rotate the discs to cause the balls to rise up the ramped pockets and hence expand the actuator axially to move the brake discs into engagement, the brake being characterised in that cooling oil is supplied into the brake housing through the wedge-shaped actuator member, when the brake is engaged.

Such an arrangement provides a simple and efficient way to feed cooling oil into the brake and cuts off the flow of coolant when the brake is disengaged which also reduces drag.

Conveniently the ball and ramp actuator is axially located between two sets of interleaved brake discs and when operated by the wedge-shaped actuator member compresses these sets of brake discs between the expanding actuator and opposed end walls of the brake housing. In such an arrangement the coolant is supplied between the two sets of interleaved discs for maximum cooling effect.

The actuator member may include an oil flow passage which, when the wedge-shaped actuator member is displaced between the confronting abutments, comes into registry with an oil supply passage, in the housing, to apply cooling oil into the brake housing.

The actuating means may comprises a fluid pressure operated piston which, when pressurised, moves the wedge-shaped actuator member between the confronting abutments.

The effective length of the actuating means may be adjustable to take account of wear of the brake discs and tolerances.

The actuator member is preferably displaced between the confronting abutments by the actuating means against the action of return spring means.

BRIEF DESCRIPTION OF THE DRAWINGS

The present invention will now be described, by way of example only, with reference to the accompanying drawings in which.

DETAILED DESCRIPTION OF THE INVENTION

Figure 1:
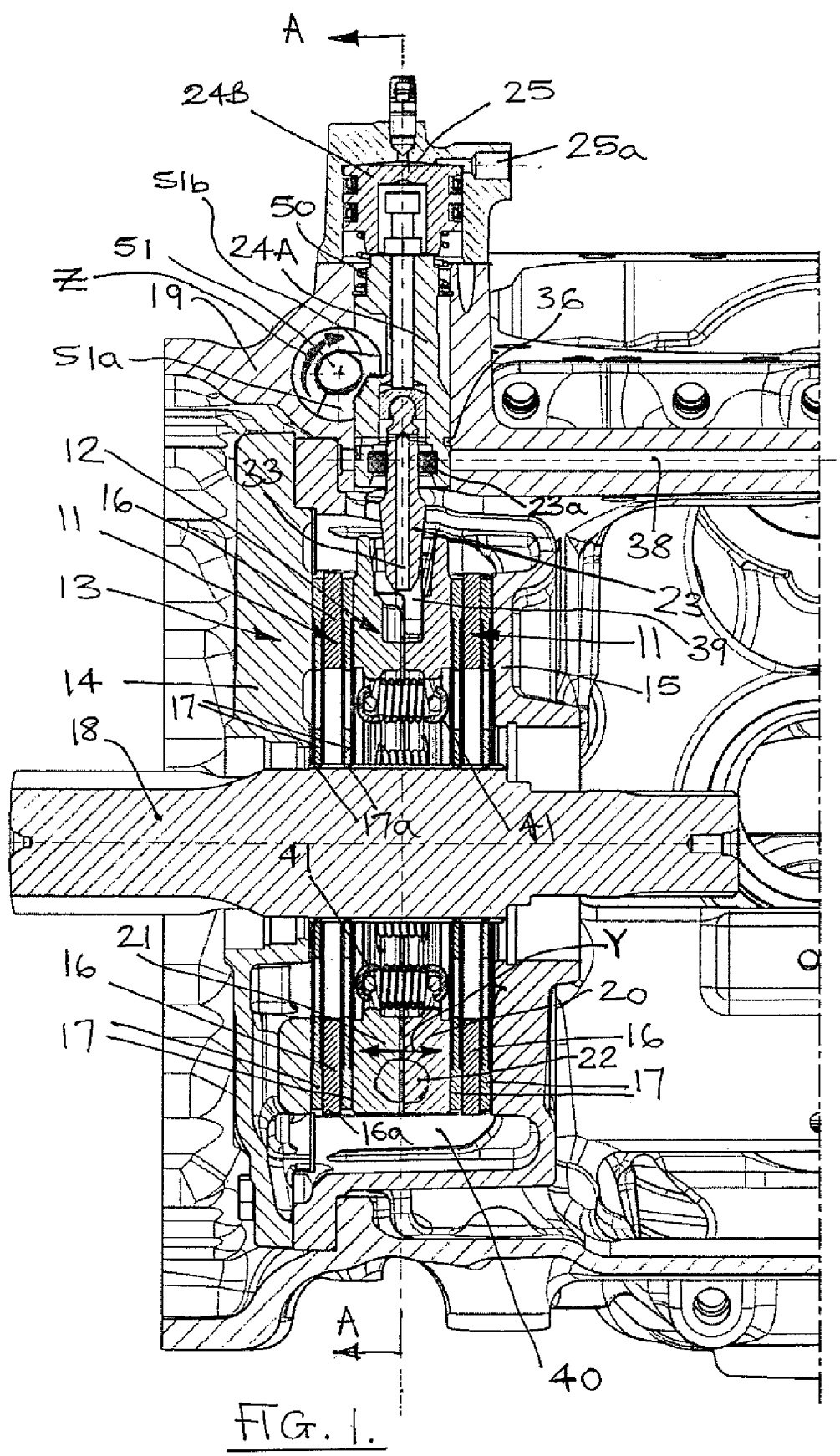
FIG. 1 shows an axial section through a disc brake in accordance with the present invention.

Referring to the drawings, a disc brake 10 comprises two sets of interleaved rotatable and non-rotatable discs 11 positioned on opposites sides of a central ball and ramp type brake actuator 12. This brake is housed in a brake housing 13 having end walls 14 and 15 respectively.

Each set of discs 11 has a non-rotatable disc 16 which is splined at 16a onto the brake housing 13 and two rotatable discs 17 which are splined at 17a onto a drive shaft 18 which is connected with an associated wheel of a tractor vehicle. As is conventional the brake housing 13 is located within a back axle housing 19 of a tractor.

The ball and ramp type actuator 12 comprises two annular relatively rotatable actuator discs 20 and 21 between which actuator balls 22 are located in circumferentially ramped pockets 20a and 21a respectively. The actuator discs 20 and 21 each carry an actuating abutment in the form of pegs 20b and 21b respectively. A wedge-shaped actuator member 23 is located between pegs 20b and 21b as best seen in FIG. 2.

Figure 2:
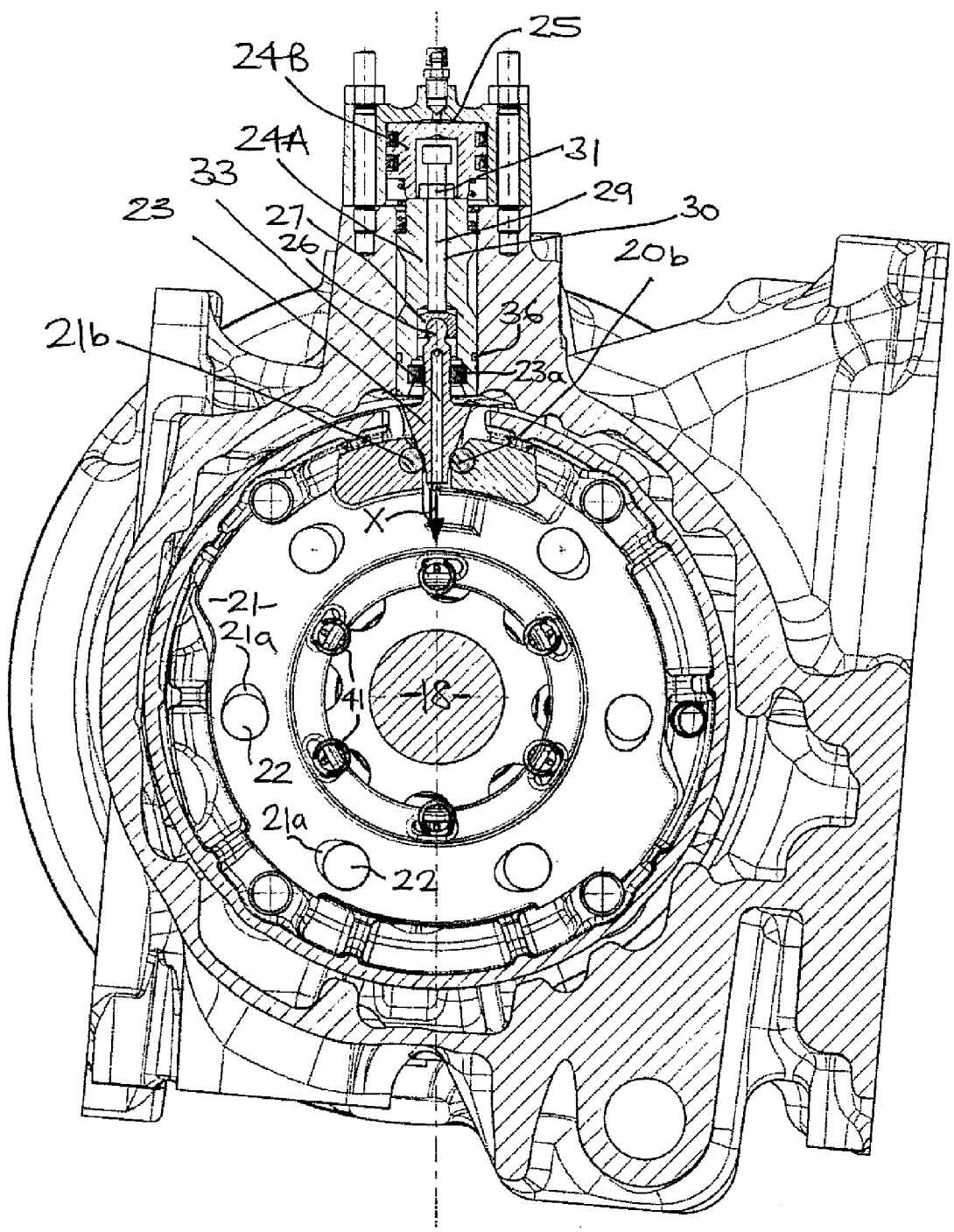
FIG. 2 shows a radial section on the line A-A of FIG. 1.

When actuator 23 is moved between the pegs 20b and 21b in direction X of FIG. 2, the pegs 20b and 21b are forced apart which causes associated discs 20 and 21 to rotate relative to each other. This in turn causes the actuator balls 22 to rise up their ramped pockets 20a and 21a to force the two actuator discs 20 and 21 axially apart (see direction Y of FIG. 1) and hence clamp the two sets of brake discs 11 between the actuator 12 and the housing end walls 14 and 15 to apply the brake in the known manner. Springs 41 act between actuator discs 20 and 21 to draw the two discs 20 and 21 towards each other and to push actuator member 23 in the direction opposite to direction X thus releasing the clamping pressure on brake discs 11 to release the brake.

The wedge-shaped actuator member 23 is moved in direction X by a two-part hydraulic piston 24A, 24B by pressurising the chamber 25 via port 25a. Actuator member 23 is mounted on piston part 24A by a ball mount 26 whose outer member 27 is moveable in a bore 28 in piston part 24A by a threaded rod 29 located in a screw threaded bore 30 in piston part 24A and an associated locking nut 31 which is tightened against the end of 32 of piston part 24A. A seal 23a seals member 23 to the piston part 24A. This ability to adjust the position of the actuator member 23 relative to piston part 24A allows the brake actuating mechanism to be adjusted to take account of wear of the sets of discs 11 and tolerances. As the discs wear the actuator member 23 is moved away from the piston part 24A.

The application of a two part piston 24A, 24B provides the advantage that actuator member 23 can be operated by service brake and park brake function.

For service brake, as mentioned above, chamber 25 is pressurized. If chamber 25 is not pressurized, return spring 50 pushes piston 24B in the direction opposite to direction X.

The park brake function is provided by a cam shaft 51 which is pivoted by a respective lever (not shown). The cam shaft 51 is equipped with a recess 51a partly projecting into piston 24A. If cam shaft 51 pivots as shown by arrow Z, edge 51b engages with the respective contact surface on piston 24A and pushes piston 24A (without moving piston 24B) in direction X to actuate the brake. If the parking brake is released, piston 24A is pushed in the direction opposite to direction X by actuator member 23 via springs 41.

Figure 3:
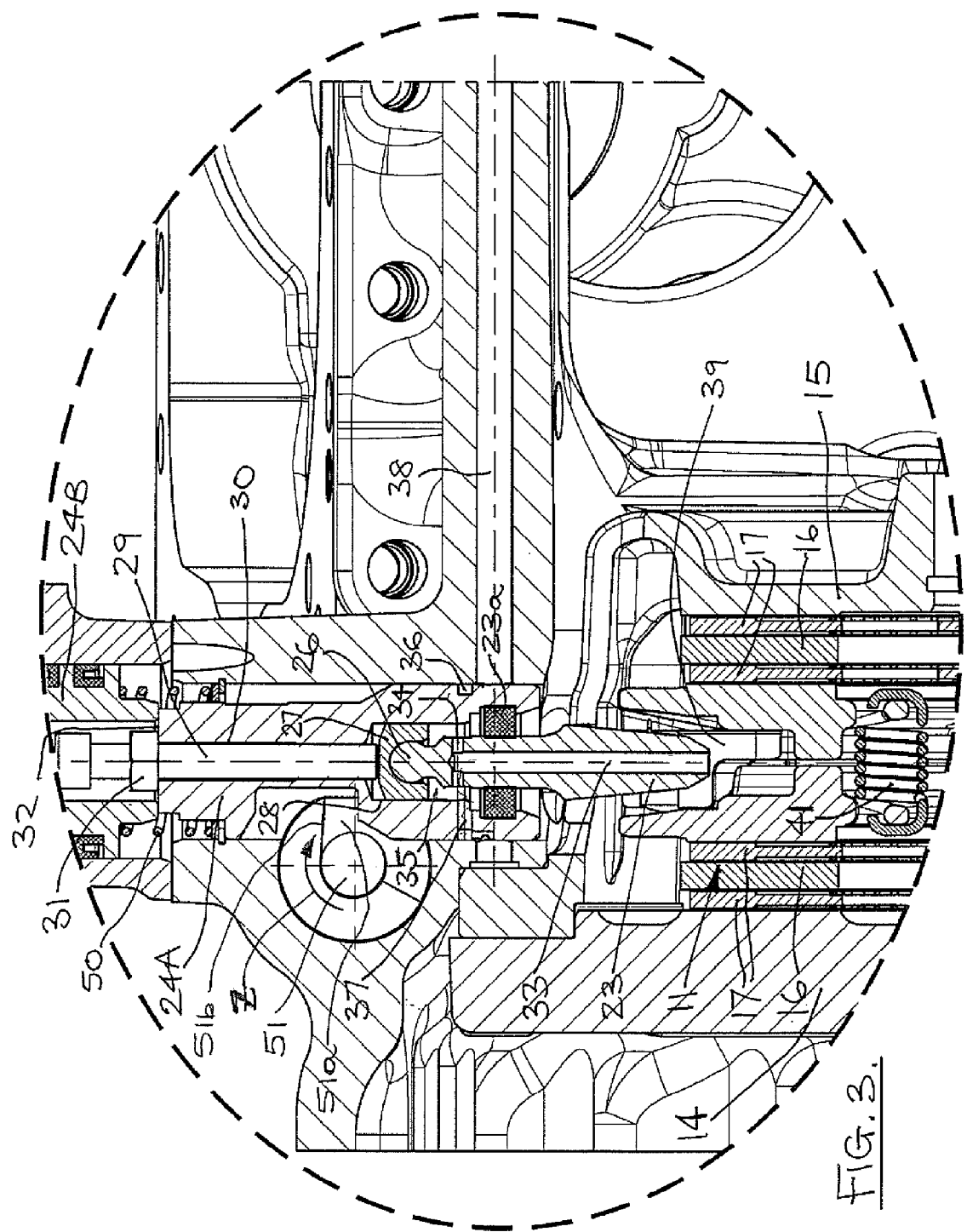
FIG. 3 shows the circled portion B of FIG. 2 on an enlarged scale.

In accordance with the present invention, the wedge-shaped actuator member 23 is provided with a central passage 33 which at its upper end, as viewed in FIG. 3, has transverse drillings 34. These transverse drillings 34 connect passage 33 to chamber 35 which is in turn connected with an external groove 36 in piston part 24A via a radial drilling 37.

As will be appreciated, as piston 24A, 24B is moved in direction X by the pressurisation of chamber 25 to engage the brake, the external groove 36 comes in to communication with passage 38 in the back axle housing 19 through which cooling oil is pumped by an associated pump (not shown). Thus as the brake is applied this cooling oil from passage 38 travels via groove 36, drilling 37, chamber 35 side drillings 34 and central passage 33 in to the volume 39 between the two actuating discs 20 and 21 of the ball and ramp actuator 12. This cooling fluid then flows downwardly as viewed in FIG. 1, in to the volume 40 at the bottom of the brake housing 13 from where it is removed by the cooling oil pump to complete the cooling circuit. When the brake is release by moving piston 24A, 24B in the direction opposite to direction X, the communication of groove 36 with passage 38 is broken so that the cooling flow stops.

The present invention thus provides a simple and efficient arrangement for feeding cooling oil into a disc brake and which cuts off the flow of coolant when the brake is disengaged which also reduces drag.

The invention claimed is:

1. A multi-plate disc brake comprising interleaved rotatable and non-rotatable brake discs within a brake housing, a ball and ramp type brake actuator comprising first and second relatively rotatable annular actuator discs with actuator balls therebetween located in circumferentially ramped pockets on opposing faces of the actuator discs, a wedge-shaped actuator member and an actuating piston to displace the actuator member between confronting abutments on the respective actuator discs to relatively rotate the discs to cause the balls to rise up the ramped pockets and hence expand the actuator axially to move the brake discs into engagement, the wedge-shaped actuator member comprising a central passage to a volume between said actuator discs, through which passage said cooling oil is supplied into the brake housing through the wedge-shaped actuator member.

2. A disc brake according to claim 1 in which cooling oil is supplied into the brake housing through the wedge-shaped actuator member when the brake is engaged.

3. A disc brake according to claim 1 in which the ball and ramp actuator is axially located between two sets of interleaved brake discs and when operated by the wedge-shaped actuator member compresses these sets of brake discs between the expanding actuator and opposed end walls of the brake housing.

4. A disc brake according to claim 1 in which the actuator member includes an oil flow passage which, when the wedge-shaped actuator member is displaced between the confronting abutments, comes into registry with an oil supply passage in the housing to apply cooling oil into the brake housing.

5. A disc brake according to claim 1 in which the actuating piston comprises a fluid pressure operated piston which, when pressurised, moves the wedge-shaped actuator member between the confronting abutments.

6. A disc brake according to claim 1 in which the effective length of the actuating piston is adjustable to take account of wear of the actuator and/or brake discs.

7. A disc brake according to claim 1 in which the actuator member is displaced between the confronting abutments by the actuating —piston against the action of a return spring.

\* \* \* \* \*